United States Patent
Kim et al.

(10) Patent No.: US 10,887,779 B1
(45) Date of Patent: Jan. 5, 2021

(54) SYSTEM FOR MANAGING EESS AND TELECOM

(71) Applicants: Benjamin Kim, Washington, DC (US); Melanie Kim, Washington, DC (US)

(72) Inventors: Benjamin Kim, Washington, DC (US); Melanie Kim, Washington, DC (US)

( * ) Notice: Subject to any disclaimer, the term of this patent is extended or adjusted under 35 U.S.C. 154(b) by 0 days.

(21) Appl. No.: 16/714,762

(22) Filed: Dec. 15, 2019

(51) Int. Cl.
*H04W 72/00* (2009.01)
*H04W 24/02* (2009.01)
*H04W 72/04* (2009.01)
*G01W 1/10* (2006.01)
*B64G 1/10* (2006.01)
*H04W 52/38* (2009.01)

(52) U.S. Cl.
CPC .......... *H04W 24/02* (2013.01); *B64G 1/1021* (2013.01); *G01W 1/10* (2013.01); *H04W 52/38* (2013.01); *H04W 72/0453* (2013.01); *B64G 2001/1042* (2013.01)

(58) Field of Classification Search
None
See application file for complete search history.

(56) References Cited

U.S. PATENT DOCUMENTS

| | | | |
|---|---|---|---|
| 2014/0154972 A1* | 6/2014 | Mengwasser | B64G 1/1007 455/12.1 |
| 2016/0020848 A1* | 1/2016 | Leonard | H04B 10/118 370/316 |
| 2016/0285611 A1* | 9/2016 | Fischer | H04W 16/14 |

\* cited by examiner

*Primary Examiner* — Erika A Washington

(57) ABSTRACT

This spectrum protection system enables spectrum sharing that protects Earth Exploration-Satellite Services (EESS) observations, which allows for uninterrupted weather forecasting, from terrestrial operations that operate near or within EESS frequency bands without cumbersome restrictions on telecommunications (telecom) providers. The system calculates the satellite observation times using a device's location recognizing that these satellites are only observing a particular location on Earth for a very small amount of time because of their orbital dynamics and scanning characteristics. Using this calculated list of observation times and comparing it to the current time input, the system then enacts a mechanism for action when EESS observations are occurring. Two simple embodiments for the mechanism for action include momentarily changing frequencies or reducing transmission power levels to prevent erroneous EESS measurements. This system allows telecom providers to operate at optimal power levels at all other times near or within the EESS frequency bands.

7 Claims, 2 Drawing Sheets

SYSTEM FOR MANAGING EESS AND TELECOM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Figure 1:
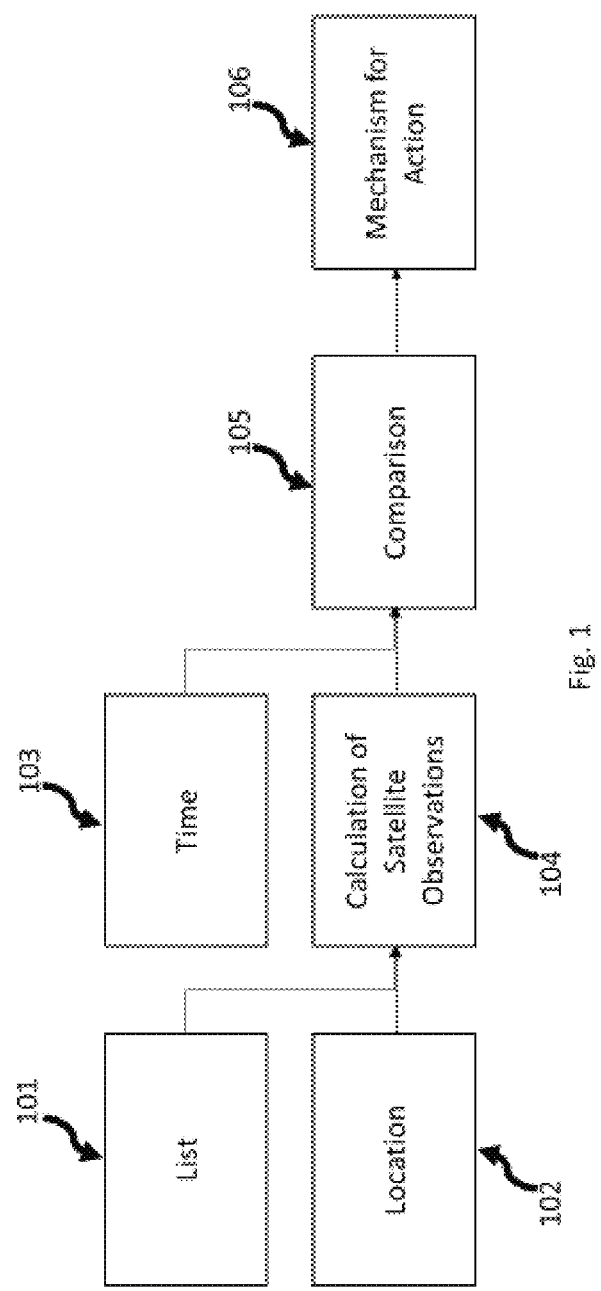

Not Applicable
INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)
Not Applicable

STATEMENT REGARDING PRIOR DISCLOSURES BY THE INVENTOR OR A JOINT INVENTOR

Not Applicable

BACKGROUND OF THE INVENTION

Field of the Invention

Radio spectrum, typically defined as between 30 Hertz (Hz) and 300 Gigahertz (GHz), are used for a variety of applications such as telecommunications (telecom), radar, astronomy, and remote sensing. Radio spectrum is a finite resource in that utilization is limited by geography, frequency, and time, meaning that at any given time and in any given place generally only one transmission can take place to prevent interference. The transmissions of radio signals are regulated under national laws and coordinated by an international body, the International Telecommunication Union (ITU), to prevent interference between different users.

The ITU is a United Nations specialized agency for information and communication technologies and is the international body that conducts spectrum regulation and harmonization worldwide. The Radio Regulations are the legal framework for spectrum management. Prior to 2019, Earth Exploration-Satellite Services (EESS) were defined by the frequencies in which earth observing systems operate and were protected from interference by the ITU's Radio Regulation No 5.340. Some examples of EESS bands include 1400-1427 MHz, 2690-2700 MHz, 10.68-10.7 GHz, 23.6-24.0 GHz, 31.3-31.8 GHz, 50.2-50.4 GHz, 52.6-54.24 GHz, 86-92 GHz, 100-102 GHz, 164-167 GHz, 200-209 GHz, and 250-252 GHz and encompass valuable low-band, mid-band, millimeter wave and submillimeter wave radio spectrum. Thus, the sole method of protecting EESS was segregation in that other uses, like telecom, were prevented from operating in and near these frequency bands.

One of the key frequency bands for EESS is 23.6-24.0 GHz as these are the frequencies in which weather satellites passively measure water vapor from the ground all the way through our atmosphere. The measurements are focused on this frequency range because water vapor transmits a miniscule amount of radiation that peaks at 23.8 GHz. The radiation produced by water vapor is orders of magnitude lower in power than active telecom transmissions. This physical characteristic of water vapor allows for observations of temperature, moisture, and pressure from the surface of the earth all the way through the atmosphere whereas other bands such as 50.2-50.4 GHz typically observe only the upper atmosphere. As this transmission by water vapor is a naturally occurring physical property not observable at different frequencies, these observations would be lost if interference were to occur. These measurements serve as the fundamental basis for the 3 to 7 day weather forecasts globally.

Given the increased demand for spectrum required for telecom, the World Radiocommunication Conference 2019 (WRC-19), which is the forum for changing the Radio Regulations, decided that a set of frequencies 24.25 GHz and higher could be used for International Mobile Telecom or 5G. Even though there is a separation between 24.0 GHz and 24.25 GHz of 250 Megahertz (MHz), the active telecom transmissions are imperfect and will interfere with neighboring frequency bands. In an attempt to mitigate the interference, the conference enacted restrictive out-of-band emission (OOBE) protection levels on telecom providers of −33 decibel-watt (dBW)/200 MHz for base stations (e.g. cell phone macrocells, microcells, picocells, and femtocells) and −29 dBW/200 MHz for mobile stations (e.g. cell phones, automobiles, drones, internet-of-thing devices, etc.), which are significantly more restrictive than typically enacted. Additionally, the ITU will enforce even stricter limits to be enacted in the year 2027. But, prior to this conference, NASA had stated that an OOBE limit of −52 dBW/200 MHz was required to ensure that there were not any effect on the weather observations. Additionally, NOAA reported that they expected a potential loss of 77% of data from their satellites if the typical telecom OOBE limit was enacted.

Given the decision at the WRC-19, the ITU now utilizes two protection methods for EESS, segregation and OOBE limits. But, even with the restrictive OOBE limits, this new service adjacent to a key EESS frequency band is expected to interfere with the weather observations. Thus, the compromise developed at WRC-19 negatively impacts both telecoms, because of the OOBE limits, as well as world's ability to accurately observe the earth and forecast the weather.

Description of Related Art Including Information Disclosed Under 37 CFR 1.97 and 1.98
Not Applicable

BRIEF SUMMARY OF INVENTION

This spectrum protection system protects Earth Exploration-Satellite Services (EESS) observations, which allows for uninterrupted weather forecasting, from terrestrial operations that operate near or within EESS frequency bands without cumbersome restrictions on telecommunications (telecom) providers. The system calculates EESS observation times using a device's location and list of applicable satellites. Comparing the calculated EESS observation times to the device's current local time, the system then enacts a mechanism for action such as momentarily changing frequencies or reducing transmission power levels. This prevents erroneous EESS measurements by taking advantage of the orbital dynamics of these satellites as they are only observing a particular location on Earth for a limited amount of time. This system allows telecom providers to operate at optimal power levels at all other times near or within the EESS frequency bands.

BRIEF DESCRIPTION OF THE SEVERAL VIEWS OF THE DRAWING(S)

Figure 2:
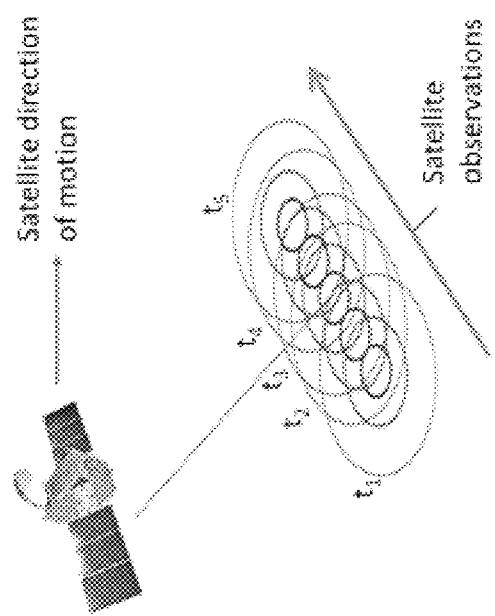

FIG. 1 is a functional block diagram of the spectrum protection system showing various inputs and functions according to one embodiment of the invention. The various blocks are described where:
  101 is an input comprising of a list of EESS satellites
  102 is an input comprising of a geographic location of the device that the spectrum protection system is enacted upon
  103 is an input comprising of a current time at the device's location
  104 is a calculation of the list of satellite observation times incorporating a margin of safety as determined from the inputs of the list of EESS satellites (101) and the geographic location of the device (102)
  105 is a comparison of the current time (103) to the calculated list of satellite observation times (104)
  106 is a mechanism for action to control the device's transmissions FIG.2 is a graphical representation of a typical EESS satellite and observations over time. The circles represent the observations directed toward the surface of the Earth and the adjacent notations $t_1$, $t_2$, $t_3$, $t_4$, and $t_5$ demonstrate how the observations are continuously changing physical location with respect to time. Additionally, the satellite's motion with respect to the earth is also changing the physical location of observations with respect to time.

DETAILED DESCRIPTION OF THE INVENTION

The current methods utilized for protecting Earth Exploration-Satellite Services (EESS) observations from interference is no longer solely frequency segregation. The frequencies adjacent to EESS frequency bands are now authorized for use by telecoms with cumbersome restrictions. This spectrum protection system protects EESS observations, which allows for uninterrupted weather forecasting, from terrestrial operations that operate near or within EESS frequency bands without cumbersome restrictions on telecommunications (telecom) providers. This system enables spectrum sharing by accounting for the orbital dynamics of the satellites conducting EESS and deconflicts the observations from the telecom operations.

Most satellites conducting EESS observations utilize a polar orbit meaning that they traverse from the south pole to the north pole and then from the north pole to the south pole. This means that they are only over a given location for a moment on any given day as well as traverse longitude constantly as the Earth rotates below them. This spectrum protection system calculates EESS observation times using a device's location. The system compares the current time to the calculated list and if warranted enacts a mechanism for action such as momentarily changing frequencies or reducing transmission power levels to prevent erroneous EESS measurements taking advantage of the orbital dynamics of these satellites, where the satellites are only observing a particular location on Earth for a limited amount of time as shown in FIG. 2. This system allows telecom providers to operate at optimal power levels at all other times near or within the EESS frequency bands. FIG. 1 illustrates this system in accordance with an embodiment of the invention.

As shown in FIG. 1, this spectrum protection system has at least three fundamental inputs: location 102, time 103, and the list of applicable satellites 101. From the two inputs of location 102 and the list of applicable satellites 101, a calculation is completed to determine when the EESS satellites will be taking observations of the specific device's location 104. By comparing the calculated satellite observation times 104 with the current time 105, the system can implement an mechanism for action 106 such as either momentarily redirect to alternative frequencies or reduce the transmit power level as the satellite observations are taken.

FIG. 2 has the satellite direction of motion annotated with respect to the Earth. As most EESS satellites are orbiting at 824 kilometers above the surface of the Earth, the velocity of these satellites is approximately 7.434 kilometers per second. The most advanced instrument that the United States currently uses is called Advanced Technology Microwave Sounder (ATMS) which scans across a swath of 2600 kilometers in 8/3 of a second. Thus, the scanning motion means that only approximately 5 of the 96 total observations of the swath taken by ATMS need to be avoided at any given location on the Earth. FIG. 2 represents this scanning motion with the circles representing the observations directed toward the surface of the Earth and the adjacent notations $t_1$, $t_2$, $t_3$, $t_4$, and $t_5$ demonstrating how the observations are continuously changing physical location with respect to time. This equates to less than 0.2 seconds of time in which telecom and their customers need to either redirect or reduce their transmit power levels. The older style of instrument that the United States still uses, the Advanced Microwave Sounding Unit (AMSU) takes fewer observations and thus the time for action required is even less than ATMS. Other meteorological organization worldwide utilize similar instruments for their observations. The duration of the mechanism for action 106 can be varied by implementing a buffer time before and after the observation incorporated into the calculation of the observation times 104. Depending on the buffer added before and after the actual time, which would be dependent on the margin of safety implemented, the result could be approximately 1 second. This margin of safety to the observations may be dependent on the accuracy of the inputs and the method of the calculation of the satellite observation times is completed. Even if the extreme action of disabling the transmission in and near the EESS bands occurred for this duration, this spectrum protection system still meets the demands of telecom customers. After the satellite observations are complete, normal operations can be resumed by telecom services immediately.

The input of the list of EESS satellites 101 can either be pre-determined or pulled from a trusted master database depending on the sophistication of the implementation. This list can be populated from a variety of freely available on-line sources including the NASA Space Science Data Coordinated Archive, the National Telecommunications and Information Administration's planned spectrum sharing database or The World Meteorological Organization's (WMO) Observing Systems Capability Analysis and Review Tool (OSCAR). The preferred embodiment is obtaining the list from the WMO's OSCAR tool as the WMO Resolution 40 requires the free and unrestricted international exchange of meteorological data ensuring the most comprehensive list. Implementations of pre-determined lists in the spectrum protection system would require modification as new satellites are brought into service or old satellites are decommissioned.

The input of location 102 can vary with the implementation of the spectrum protection system. In cell phone or vehicle type applications, the inputs can be from a Global Navigation Satellite System (GNSS) like GPS or provided by network-based techniques. For 5G connected fixed-location devices such as light poles, home appliances or cell phone towers, the input can be hard-coded, manually entered, or pushed to the device after some form of position verification.

The input of time 103 can be driven by a local clock such as an oscillator or transmitted from a trusted master time source. In cell phone or vehicle type applications, the inputs can be from the telecom network connection provided by a local cell phone tower's eNodeB element. For a hardwired application, the input can be from a network time protocol server or even an atomic clock source. The comparison between the calculated satellite observation times and input of device's current time 105 need to reference the same units for time zones as well as modifications for daylight savings depending on the source.

The calculation of the satellite observation times 104 can be updated depending on the application. For example, a cell phone could update the list of satellite observation times with motion as given by either an accelerometer, with a new updated GNSS location, or conversely at the maximum travel speed expected of the device. For a stationary application like a 5G connected utility pole, the list of satellite observation times can be updated when satellites are brought into or removed from service. There are a number of embodiments to determine the list of satellite observation times ranging from a simple calculation using a satellite's Local Time of Ascending Node (LTAN) and the device's distance from the equator to utilizing real-time satellite orbital parameters coupled with the device's exact location. The preferred embodiment is to obtain the two-line elements (TLE), comprising the parameters required to uniquely identify a specific orbit for each of the satellites in the list 101. TLE information is freely provided by the United States Space Force through a website as well as other organizations like CelesTrak from The Center for Space Standards and Innovation. Utilizing the TLE information with a suitable prediction formula, such as the SGP4 model created by Ken Crawford in 1970, the precise positions for these satellites at any point in the past or future can be determined. Once the orbits are calculated comprising of times and locations for the satellites selected, the list of satellite observation times 104 can be created by determining the intersection of the device's location 102 and satellites' positions incorporating times before and after for a margin of safety. The accuracies of the orbital calculations, physical location and current time can all affect the margin of safety where high precision in all will result in the smallest margin required. Additionally, the list of satellite observation times can be filtered based on the application and the inclination of the satellite. For example, a stationary cell phone tower in Washington D.C., located at the latitude of approximately 38.9 degrees North, would be able to filter out the French/Indian satellite Megha-Tropiques as the inclination of this particular satellite is approximately 20 degrees meaning that the satellite only orbits a band approximately between the latitudes of 30 degrees North to 30 degrees South.

The comparison of the current time input to the list of satellite observation times 105 can be dependent on the application. For example, a device in motion such as an aircraft would need more frequent updates to the calculated satellite observation times based on the location thus requiring more frequent comparisons than a stationary device. The output of the comparison triggers the mechanism for action 106.

There are a multitude of embodiments for the mechanism for action 106 which ranges from code that is implemented in an existing device to a device that physically attaches to an antenna to one that blocks transmission toward the sky. But the preferred implementation is an algorithm that can be inserted into either the firmware or software that controls the operation of the associated mobile stations or base stations. The spectrum protection system can either be implemented locally, partially remotely or fully remotely, like at a central control facility.

We claim:

1. A spectrum protection system that allows for remote sensing through the coexistence of a telecommunication device and Earth Exploration-Satellite Services utilizing the same or adjacent frequency bands by deconflicting transmissions and observations in time and location comprising:
   a. an input of a physical location of the telecommunication device to the system;
   b. an input of a current time at the physical location of the telecommunication device to the system;
   c. an input of a list of applicable satellites to the system;
   d. a calculation conducted by the system resulting in a list of satellite observation times with appropriate margins of safety based off the inputs of physical location of the telecommunication device and the list of applicable satellites;
   e. a comparison conducted by the system between the calculated list of satellite observation times with the input of current time outputting a positive match or a negative match; and
   f. a mechanism for action controlled by the system when the comparison returns a positive match, wherein the action includes at least one of redirecting the telecommunication device to an alternative frequency or reducing the transmit power level of the telecommunication device.

2. The spectrum protection system of claim 1, wherein the system can either be implemented locally, remotely, or partially remotely.

3. The spectrum protection system of claim 1, wherein the system can either be implemented in an application located in memory and executed on a processor or in firmware including a dedicated circuit or embedded in a larger circuit.

4. The spectrum protection system of claim 1, wherein the input of physical location can be provided either as a static or dynamic input.

5. The spectrum protection system of claim 1, wherein the input of current time can be provided either from a local or remote source.

6. The spectrum protection system of claim 1, wherein the list of applicable satellites can either be provided locally, remotely, or partially remotely.

7. The spectrum protection system of claim 1, wherein the mechanism for action can either be implemented by the spectrum protection system or in a separate device controlled by the system.

* * * * *